United States Patent [19]

Chen

[11] Patent Number: 4,886,041

[45] Date of Patent: Dec. 12, 1989

[54] CONTINUOUS PROCESSING BAKING MACHINES

[76] Inventor: Tsai A. Chen, 201 Sec. 3 BA-DAR, Taipei, Taiwan

[21] Appl. No.: 178,981

[22] Filed: Apr. 7, 1988

[51] Int. Cl.$^4$ .................. A21B 1/00; F24C 15/32; A23L 3/00

[52] U.S. Cl. .................. 126/19 R; 99/443 R; 99/359

[58] Field of Search .................. 126/273, 41 R, 41 C, 126/21 R, 21 A, 19 R; 99/359, 361, 360, 380, 386, 443

[56] References Cited

U.S. PATENT DOCUMENTS

3,529,554  9/1970  Tillander .................. 126/19 R
4,322,204  3/1982  Voegtlin et al. .................. 126/19 R X
4,767,639  8/1988  Orii .................. 126/19 R X Primary Examiner—Larry Jones
Attorney, Agent, or Firm—Morton J. Rosenberg

[57] ABSTRACT

The continuous processing baking machine includes an outer case containing an upgrading means, a downgrading means, a transferring unit and a heating unit in which a plurality of baking molds containing raw materials are delivered through the process of entering the baking molds into the outer case, upgrading the baking molds, transferring the baking molds, downgrading the baking molds and removing the baking molds with stepped intervals for sectionally baking the raw materials by the heating unit.

7 Claims, 7 Drawing Sheets

CONTINUOUS PROCESSING BAKING MACHINES

FIELD OF THE INVENTION

This invention relates to a baking machine, particularly to a baking machine with continuous process.

SUMMARY OF THE INVENTION

It is an object of the present invention to provide a continuous processing baking machine with improved baking capacity and effectiveness.

The continuous processing baking machine according to the present invention consists of an outer case divided into a baking space and a shifting space, in which the baking space contains an upgrading means having an upgrading frame supported upon an actuating rod of a cylinder vertically disposed on the floor within the baking space for upgrading a plurality of baking molds containing raw materials, which are entered through an entrance formed in the outer case, a downgrading means having a downgrading frame supported upon an actuating rod of a cylinder vertically disposed on the floor within the baking space for downgrading a plurality of baking molds coming from the upgrading means toward an exit, a transferring unit for transferring the baking molds from the top grade of the upgrading means to the top grade of the downgrading means and a heating unit having a plurality of heating plates and isolating plates extending substantially horizontally from a frame movably mounted within the shifting space of the outer case. The process of entering the baking molds, upgrading the baking molds, transferring the baking molds, downgrading the baking molds and extruding the baking molds proceeds with intervals for baking the raw materials contained in the baking molds within the upgrading means and the downgrading means by the heating unit, and thus automatically and continuously baking the raw materials therein.

DESCRIPTION OF THE PREFERRED EMBODIMENTS

Figure 1:
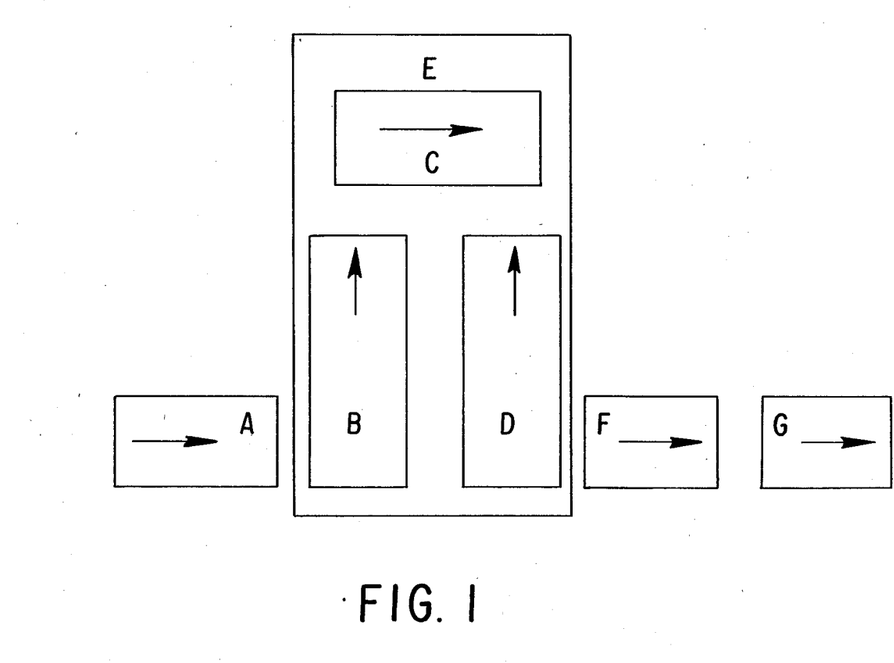
FIG. 1 is a schematic plan view embodying the arrangement of a continuous baking process according to the present invention.

Please refer to FIG. 1, a schematic plan view embodying the continuous baking process of the present invention, wherein the block E represents an outer case of this inventive machine containing smaller blocks of B, C and D which represent an upgrading means, a transferring unit and a downgrading means respectively.

A start position A, where a baking plate or baking mold containing firm paste and other desirous materials is ready to be entered into the case E for baking, is located at a lower side of said case E. A terminal position F is located at the opposite side of the case E for holding a baking mold or baking plate containing fully baked cakes or the like removed from the case E. The block G located next to the block F represents a means for cutting the baked cakes into parts if necessary.

Figure 2:
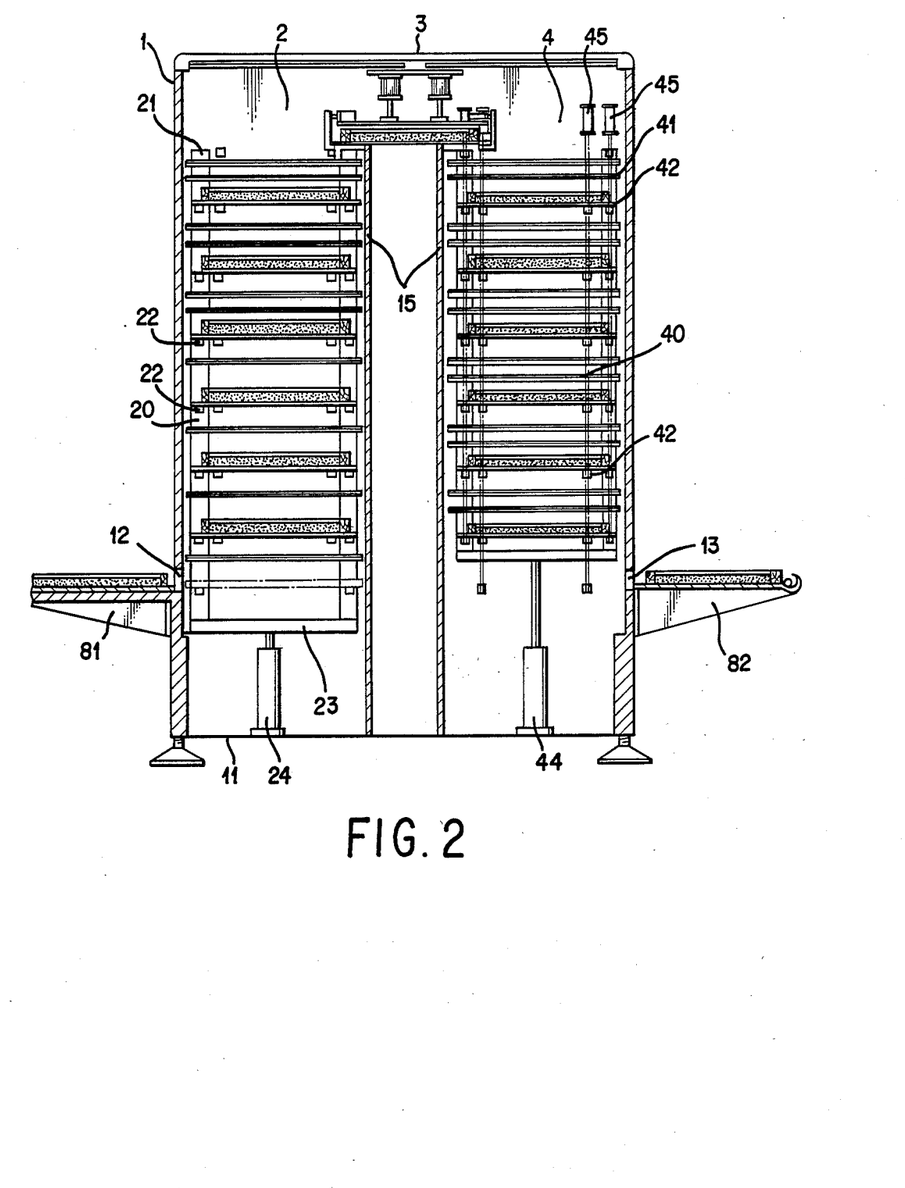
FIG. 2 is a cross-sectional front view of a continuous processing baking machine according to the present invention.
Figure 3:
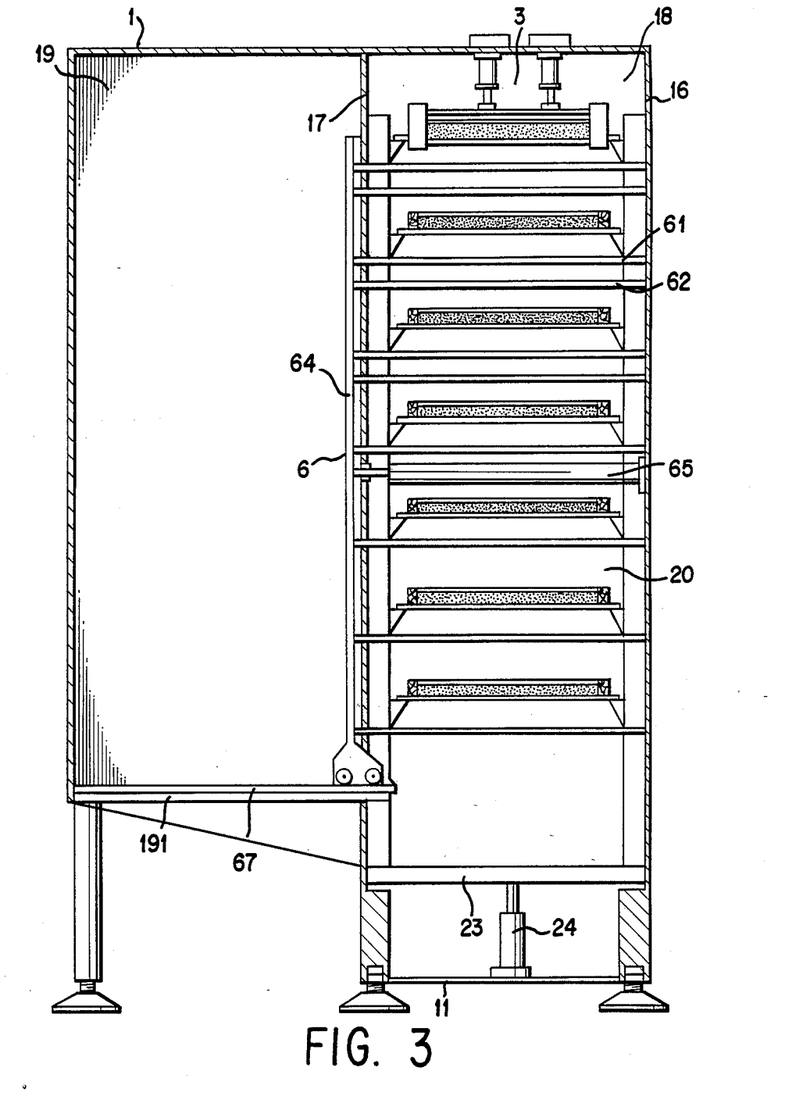
FIG. 3 is a cross-sectional side view of a continuous processing baking machine according to the present invention in which the heating unit is in baking condition.
Figure 4:
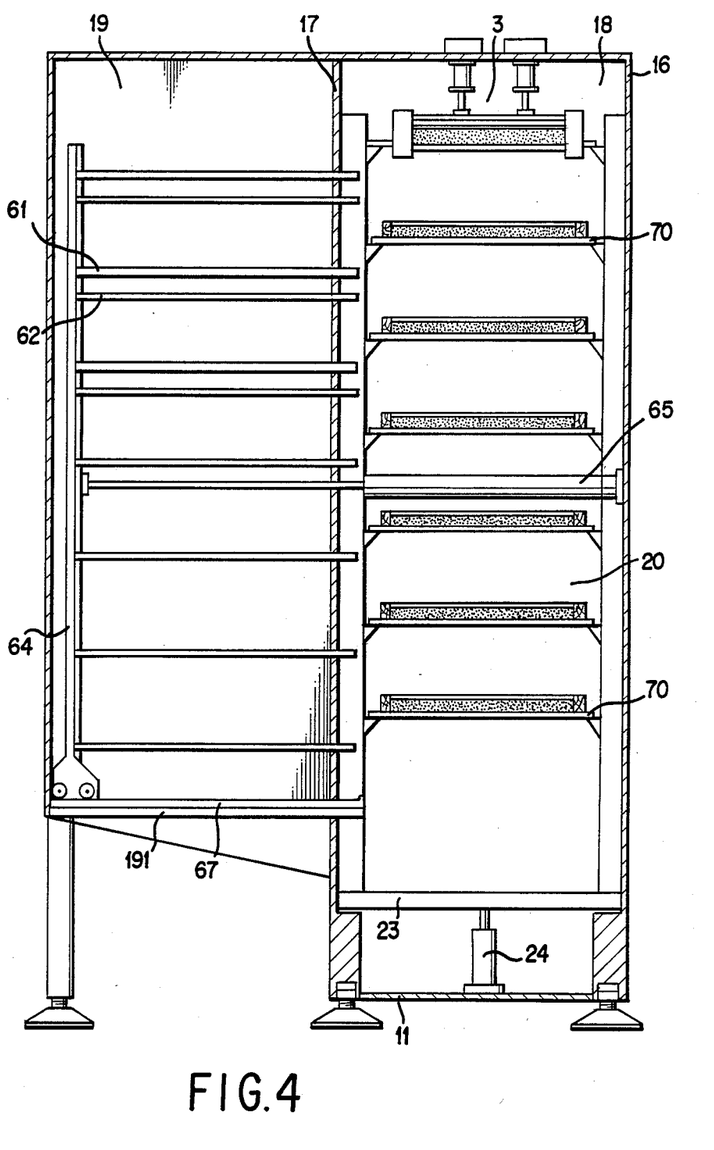
FIG. 4 is a cross-sectional view of a continuous processing baking machine according to the present invention in which the heating unit is in withdrawn condition.

As shown in FIGS. 2, 3 and 4, there are two plates 81, 82 secured on the lower opposite sides of the case 1 for providing the start position A and the other providing the terminal F. An entrance 12 and an exit 13 are formed in the case 1. The inner space of the case 1 is divided into a baking space 18 and a shifting space 19 by a wall 17. There are rails 67 secured on the floor 191 of said shifting space 19 on which a heating unit 6 can be controlled to shift back and forth by a cylinder 65.

The upgrading means 2 and downgrading means 4 are spacedly arranged in the baking space 18 and separated from each other with a pair of isolating plates 15, including an upgrading frame 20 and a downgrading frame 40 respectively supported upon hydraulic cylinders 24, 44, which are vertically disposed on the floor 11 periodically actuating upward and downward movements of the upgrading frame 20 and downgrading frame 40.

Figure 5:
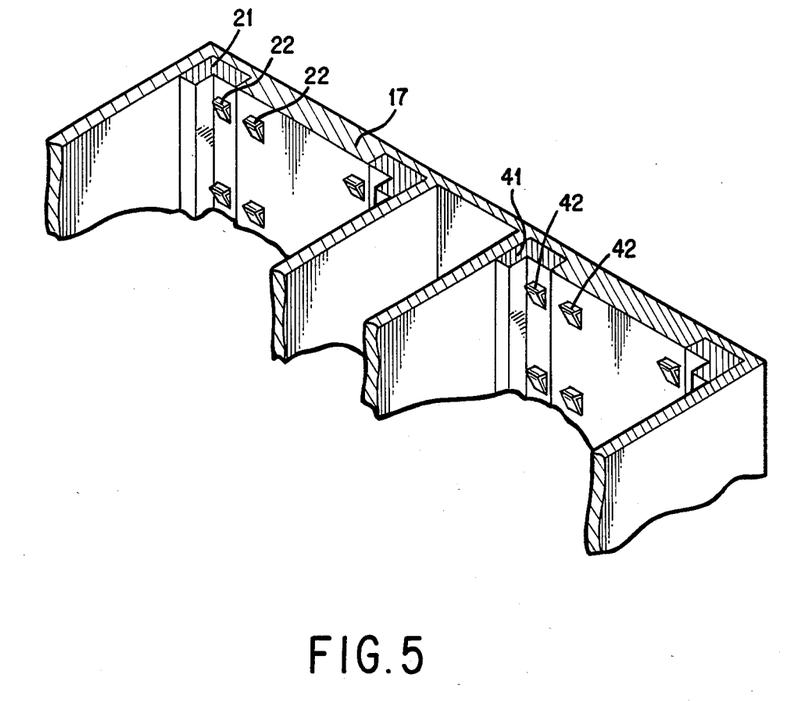
FIG. 5 is a partial perspective view of a continuous processing baking machine according to the present invention showing the series of projector members gradedly secured to the frames and the adjacent wall.
Figure 6A:
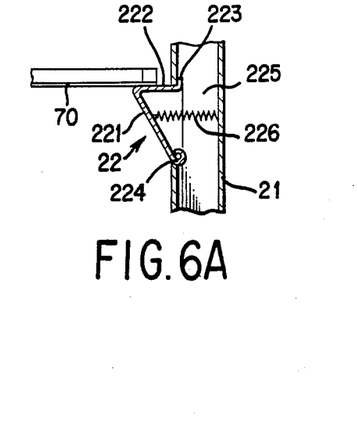
FIG. 6A is a cross-sectional view showing a projector member normally projected to support a baking mold partially shown and a related bar.
Figure 6B:
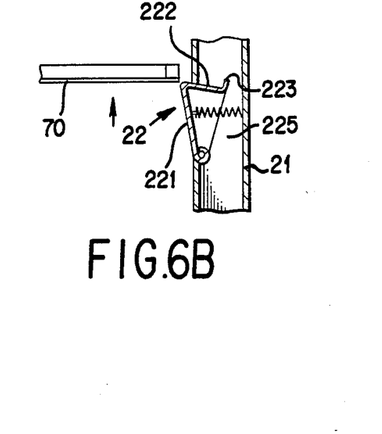
FIG. 6B is a cross-sectional view showing a projector member pushed to rotate clockwise by a rising baking mold partially shown and a related bar.

Referring to FIGS. 5 and 6, the said upgrading frame 20 includes four bars 21 vertically fixed on the corners of a bottom plate 23. A plural series of projector members 22, which comprises an inclined plate 221 inclining downwardly and rearwards with the lower end rotatably pivoted to swivel about a pin 224, are secured in corresponding spaces 225 formed in the bars 21 and their adjacent walls 16 and 17. The projector members also include a top plate 222 having a stop 223 raising from the rear portion normally abutting against an inner face of the space 225, and integrally formed on said inclined plate 221, are gradedly installed and normally expelled by compressed springs 226 inserted in respective spaces 225. While the baking mold 70 is carried upwardly by the upgrading means 2, an edge of the baking mold 70 will contact the inclined plate 221 of projector member 22 and press it to rotate clockwise to withdraw. Each series of the projector members 22 is so arranged that the withdrawn projector members 22 permit a baking mold to pass through upwardly, and will immediately return to support the baking mold 70 thereafter.

Figure 7A:
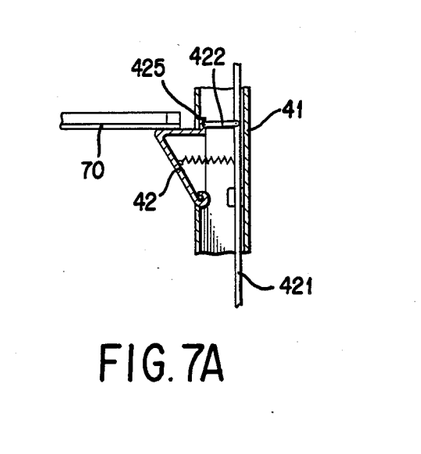
FIG. 7A is a cross-sectional view showing a projector member normally projected to support a baking mold partially shown, a related bar and an actuating rod with a connecting link
Figure 7B:
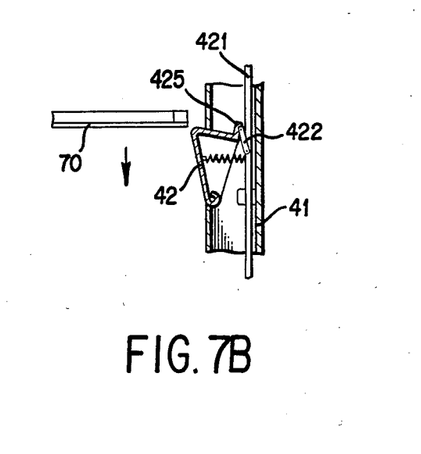
FIG. 7B is a cross-sectional view showing a projector member controlled to rotate clockwise by an actuating rod through a connecting link, a descending baking mold partially shown and a related bar; and, FIG. 8 is a schematic front view showing a shifting unit of a continuous processing baking machine according to the present invention.

The construction of the downgrading means 4 is substantially the same as that of the upgrading means 2 except the alternative arrangement of the projector members 42 suitable for the downgrading delivery of the baking molds 70. As shown in FIGS. 2, 7A and 7B, there are additional actuating rods 421 vertically arranged in the bars 41, the wall 17 and the side wall 16 having a plurality of connecting links 422 rotatably pivoted to respective stops 425 of the projector members 42. The actuating rods 421 are controlled by the cylinders 45 to move downwardly to withdraw the projector members 42 prior to the descent of the baking molds 70 and maintain so after the baking molds 70 pass through the corresponding series of the projector members 42, and the actuating rod 421 is controlled to withdraw for releasing the projector members 42 to return to the expelled positions to support the baking molds 70.

In short, the upgrading means 2 delivers the baking molds 70 locating therein from one grade to the next grade upwardly and the downgrading means delivers the baking molds 70 therein from one grade to another downwardly toward the exit 13.

The heating unit 6 movably mounted on the rails 67 is controlled by the cylinder 65 to move back and forth, having a frame 64 and a plurality of heating plates 61, which are preferably divided into two groups to respectively serve the upgrading means 2 and the downgrading means 4. The heating plates extend substantially horizontally from the frame 64. The maturities of the baking materials are obviously different in accordance with their different positions within the upgrading means 2 and the downgrading means 4. In order to offer suitable heating to fully bake the materials so positioned, the heating plates 61 are preferably controlled individually. What is more, the group for serving the downgrading means 4 and the upper portion of the other group for serving the upgrading means 2 are further provided with isolating plates 62 extending substantially horizontally underneath the corresponding heating plates 61. The heating plates 61 and the isolating plates 62 will extend into the intervals between the adjacent baking positions or grades at the baking space 18, through respective holes formed correspondingly in the wall 17, when the heating unit 6 is controlled to move toward the wall 17. The baking materials contained in the baking molds 70 located at the upper grades of the upgrading means 2 and at all grades of the downgrading means 4 are substantially isolated and baked with less heat according to their maturities. Generally, a baking operational sequence comprising actuating the heating unit 6 to be moved toward the wall 17 so that the heating plates 61 and isolating plates 62 extend into the baking space, heating and then withdrawing the heating unit 6. These operations are applied within the interval between baking mold displacement by the upgrading means and downgrading means, whose deliveries are simultaneously executed.

Figure 8:
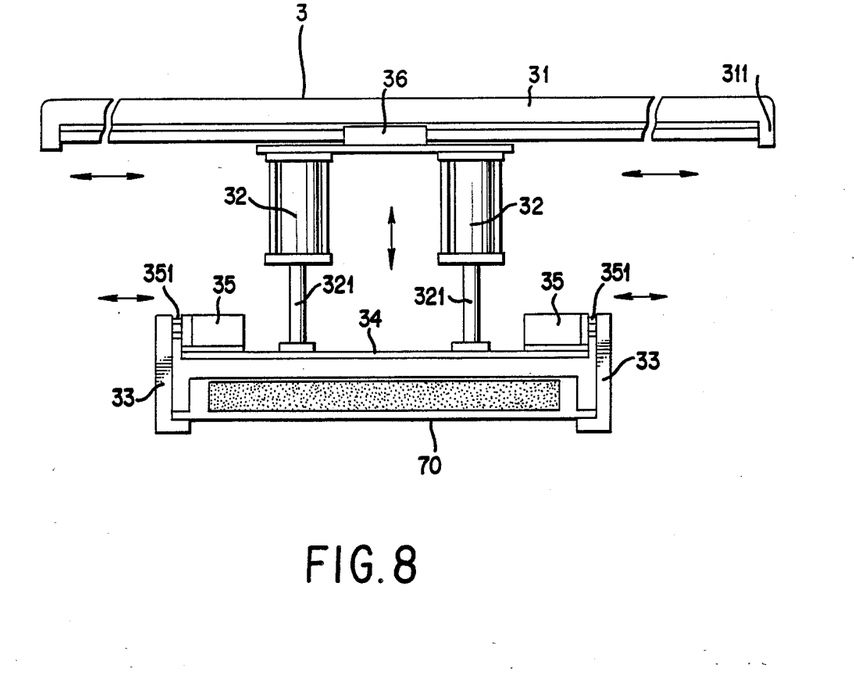

As shown in FIGS. 2 and 8, the transferring unit 3 disposed above the upgrading means 2 and the downgrading means 4 in the baking space 18 for transferring the baking molds 70 from the top grade of the upgrading means 2 to the top grade of the downgrading means 4 comprises a frame 31 with two arches 311 formed at both ends and a rail 312 disposed therebetween. A cable cylinder 36 is movably mounted on the rail 312 and is provided with driving power for remotely controlling its movements along the rail 312. A pair of cylinders 32 with actuating rods 321 are vertically secured to the bottom of the cable cylinder 36. A base 34 is attached to the ends of the actuating rods 321, and is provided with a pair of cylinders 35 disposed on opposing sides of the base 35 having actuating rods 351 substantially horizontally arranged with hook members 33 respectively secured on the ends thereof for cooperatively seizing a baking mold 70 or releasing it through control of the cylinders 35.

It will be appreciated, of course, that although a particular embodiment of the invention has been described, modification may be made. It is intended in the following claims to cover all modifications which fall within the scope of the invention.

What is claimed is:

1. A continuous processing baking machine for baking raw materials placed in a plurality of baking molds, comprising:

an outer case having an entrance and an exit properly formed therein;

upgrading means positionally located within said outer case having a first cylinder vertically disposed on a floor portion of said outer case for transporting said baking molds from said entrance in an ascending substantially vertical direction, said first cylinder having an actuating rod and an upgrading frame having a plurality of baking positions firmly supported upon an end portion of said first cylinder actuating rod;

downgrading means positionally located within said outer case and spaced from said upgrading means having a second cylinder vertically disposed on the floor of said outer case for transporting said baking molds in a descending substantially vertical direction to said exit, said second cylinder having an actuating rod and a downgrading frame having a plurality of baking positions firmly supported upon an end portion of said second cylinder actuating rod;

transfer means disposed between said upgrading means and said downgrading means for sequentially transferring said baking molds from an uppermost portion of said upgrading means to an uppermost portion of said downgrading means; and, heating means movably mounted within said outer case for baking said raw materials, said heating means including a support frame and a plurality of heating plates coupled to said frame to protrude substantially horizontally therefrom, said plurality of heating plates being interspersed into intervals between said plurality of baking positions of both said upgrading frame and said downgrading frame for baking said raw materials in said baking molds in both said ascending and descending baking positions, each of said plurality of heating plates having its temperature individually controlled in relationship to their oven location to provide even baking of said raw materials.

2. The continuous processing baking machine as recited in claim 1 wherein said outer case includes an internal wall having a plurality of apertures formed therein, said outer case being divided by said wall into (1) a baking space containing said upgrading means, said downgrading means and said transfer means and (2) a shifting space containing said heating means displaceable toward said wall to project each of said heating plates through a respective one of said plurality of apertures into said intervals between said baking positions, or being displaceable away from said wall for withdrawing said heating plates at least partially from said baking space.

3. The continuous processing baking machine as recited in claim 2 wherein said outer case further includes a pair of isolating plates disposed between said upgrading means and downgrading means within the baking space.

4. The continuous processing baking machine as recited in claim 1 wherein both said upgrading frame and said downgrading frame each includes four substantially vertical bar members fixedly coupled to respective corners of a bottom plate member.

5. The continuous processing baking machine as recited in claim 1 wherein each of said baking positions is defined by a plurality of projector members, each of said projector members including:

an inclined plate inclining downwardly and rearwards with the lower end rotatably pivoted in a corresponding space formed in said upgrading frame, said downgrading frame or walls adjacent thereto; and a top plate having a stop portion raising on a rear portion disposed upon said inclined plate.

6. The continuous processing baking machine as recited in claim 5 wherein each of said projector members further includes a link having one end rotatably pivoted to the stop portion of the top plate and the opposing end rotatably pivoted to an actuating rod vertically arranged and controlled by a proper power unit for reciprocative displacement.

7. The continuous processing baking machine as recited in claim 1 wherein said heating means further includes a plurality of isolating plates extending substantially horizontally from said support frame, said isolating plates being positionally located beneath each of a portion of said heating plates defined by a group of heating plates comprising those interspersed in said baking position of said downgrading frame and those interspersed in an upper portion of said upgrading frame.

* * * * *